United States Patent [19]

Brown et al.

[11] 4,454,083
[45] Jun. 12, 1984

[54] CONTINUOUS MICROENCAPSULATION

[75] Inventors: Robert W. Brown; Lester A. Balster, both of Appleton, Wis.

[73] Assignee: Appleton Papers Inc., Appleton, Wis.

[21] Appl. No.: 332,385

[22] Filed: Dec. 21, 1981

[51] Int. Cl.³ .............................................. B01J 13/02
[52] U.S. Cl. ................................ 264/4.7; 428/402.21; 428/914; 346/215
[58] Field of Search .......................... 252/316; 264/4.7

[56] References Cited

U.S. PATENT DOCUMENTS

| 2,776,267 | 1/1957 | Weber et al. | 524/843 |
| 3,464,926 | 9/1969 | Vandegaer et al. | 252/316 |
| 3,577,515 | 5/1971 | Vandegaer | 252/316 X |
| 3,812,056 | 5/1974 | de la Torriente et al. | |
| 3,816,331 | 6/1974 | Brown, Jr. et al. | |
| 4,100,103 | 7/1978 | Foris et al. | 252/316 |
| 4,105,823 | 8/1978 | Hasler et al. | 252/316 X |
| 4,309,213 | 1/1982 | Graber et al. | 252/316 X |
| 4,396,670 | 8/1983 | Sinclair | 264/4.7 X |

FOREIGN PATENT DOCUMENTS 57-84740 5/1982 Japan .
2073132 10/1981 United Kingdom .

Primary Examiner—Richard D. Lovering
Attorney, Agent, or Firm—E. Frank McKinney; Paul S. Phillips, Jr.

[57] ABSTRACT

A process is disclosed for continuously manufacturing minute capsules in a closed conduit under conditions of non-turbulent flow. The continuous microencapsulation process comprises in-line emulsification of intended capsule core material in a liquid manufacturing vehicle comprising negatively-charged polyelectrolyte material and methylol melamine or etherified methylol melamine followed by conduction of the emulsion, under non-turbulent flow conditions, through a tubular reactor maintained at a single, elevated temperature.

3 Claims, 1 Drawing Figure

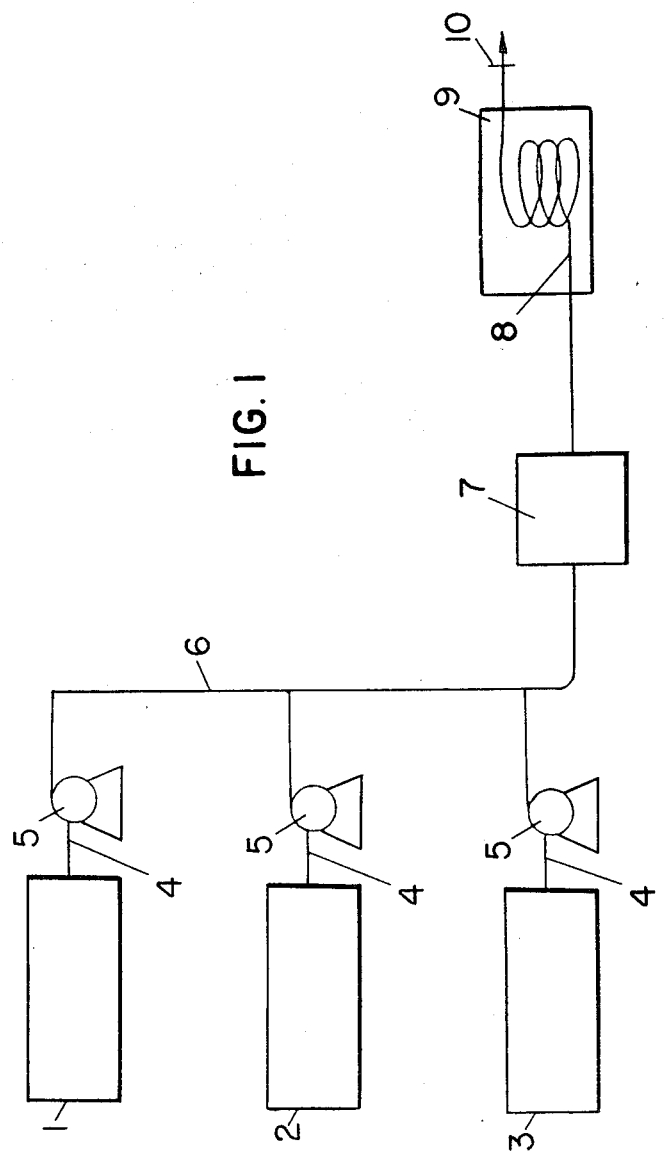

CONTINUOUS MICROENCAPSULATION

TECHNICAL FIELD

This invention relates to encapsulating processes conducted on a continuous basis. The present invention also relates to an apparatus for conducting the continuous encapsulation process. The continuous encapsulating process of this invention more particularly pertains to a method for rapidly manufacturing minute capsules of a uniform size at a constant rate through a conduit under conditions of non-turbulent flow. A preferred embodiment of the process of this invention specifically pertains to a process for continuous encapsulation by use of liquid-liquid phase separation of the in situ polycondensation product of methylol melamine or etherified methylol melamine in the presence of negatively-charged, carboxyl-substituted, linear aliphatic hydrocarbon polyelectrolyte material dissolved in an aqueous vehicle.

BACKGROUND ART

A continuous encapsulation process is disclosed in U.S. Pat. No. 3,812,056 wherein liquid-liquid phase separation is performed in a tubular capsule manufacturing conduit having a single material entrance end and a single material exit end. This process is limited by the fact that the capsule manufacturing vehicle must be passed through the conduit under turbulent flow conditions in order to prevent agglomeration of embryomic capsules as they are formed. Also a temperature gradient must be maintained along the conduit in order to enwrap the intended capsule cores with wall material. Encapsulating systems disclosed as being eligible for use in this process include methylated methylol melamine.

A similar continuous encapsulation process is disclosed in U.S. Pat. No. 3,816,331, except that the manufacturing conduit has a plurality of material introduction ports and a single material exit port. Like U.S. Pat. No. 3,812,056, the process of this disclosure requires that the capsule manufacturing vehicle must be passed through the conduit under turbulent flow conditions in order to prevent agglomeration of embryonic capsules as they are formed. Also like U.S. Pat. No. 3,812,056, a temperature gradient must be maintained along the conduit in order to enwrap the intended capsule cores with wall material.

Japanese Patent Disclosure No. 55-124534 relates to a method for continuously manufacturing microcapsules in a multi-stage cascade of reaction vessels utilizing an interfacial polymerization process for capsule wall formation.

A method of encapsulating to produce microcapsules in which the capsule wall material is produced by the acid catalysis of a water-soluble urea-formaldehyde precondensate and a water-soluble melamine-formaldehyde precondensate in the presence of a water-soluble polymer, which is capable of being cross-linked by said precondensates, is disclosed in U.S. Pat. No. 4,105,823. Example VIII relates to the use of this process to produce capsules by a continuous process whereby the capsule manufacturing vehicle flows through a series of hoppers by means of gravity through overflow pipes. The through-put of this process is such that material takes two hours to pass through the system.

A method of encapsulating by an in situ reaction of melamine and formaldehyde and/or polycondensation of monomeric methylol melamine or etherified methylol melamine, or a low molecular weight polymer thereof in the presence of negatively-charged, carboxyl-substituted linear aliphatic hydrocarbon polyelectrolyte material dissolved in an aqueous vehicle is disclosed in U.S. Pat. No. 4,100,103.

DISCLOSURE OF THE INVENTION

It is an object of the present invention to provide an improved process for the manufacture of microcapsules by a continuous flow process.

It is also an object of the present invention to provide an apparatus for conducting an improved continuous encapsulation process.

It is a further object of the present invention to provide a process for the manufacture of microcapsules by a continuous process under conditions of streamline or non-turbulent flow.

It is yet another object of the present invention to provide a continuous encapsulation process wherein high quality, mononuclear microcapsules are obtained very rapidly, at high flow rates under conditions of non-turbulent flow.

It is still another object of the present invention to provide a continuous encapsulation process wherein mononuclear microcapsules of a narrow size distribution are obtained utilizing methylol melamine or etherified methylol melamine as the in situ polymerized capsule wall material in a conduit in which a temperature gradient and turbulent flow are not required.

Other objects, aspects and advantages of this invention will be apparent to one skilled in the art from the following disclosure and appended claims.

The present invention comprises a tubular encapsulating conduit having a plurality of material introduction ports and a single material exit port in which conduit a continuous encapsulating process is performed. The encapsulating system of this process includes a methylol melamine or an etherified methylol melamine polymerized in situ to yield capsule wall material as disclosed in U.S. Pat. No. 4,100,103, which is hereby incorporated by reference. This polymerization comprises polycondensation of methylol melamine or etherified methylol melamine in an aqueous vehicle and the reaction is conducted in the presence of negatively-charged, carboxyl-substituted, linear aliphatic hydrocarbon polyelectrolyte material dissolved in the vehicle. The material to be encapsulated is substantially insoluble in the vehicle and in other components of the system and is not reactive with any of the components. In practice of the invention, the material to be encapsulated is combined with the other components of the encapsulating system prior to introduction into the emulsification mill. The additions of the components are made by means of pumps into the encapsulating conduit. The system, after all additions, is passed through an in-line emulsification mill. The proper drop size of the liquid intended core material is obtained, in part, as a result of the flow rate through the mill. This flow rate is controlled in turn, by the pump rates at the material introduction ports. The resultant emulsion then flows into a reactor, maintained at a temperature higher than room temperature, preferably 40°–95° C. and more preferably 60°–95° C., where the residence time is sufficient for walls to form on the individual core material droplets and the resultant material to emerge from the exit port as finished microcapsules. The temperature of the reactor is constant throughout and no temperature cycle (or gradient) is required to complete the encapsulation.

In the prior art continuous encapsulation processes there was a requirement to maintain the material components of the encapsulating system uniformly turbulent all along the encapsulating conduit in order to prevent agglomeration of the capsules produced. In the process and apparatus of the present invention turbulent flow of the encapsulating system is not required, desirable or even practical. Also the prior art continuous encapsulation processes required the establishment and maintenance of temperature gradients along the conduit in order to separate the phase of capsule wall material, to render the separated phase more viscous, to enwrap dispersed intended capsule core materials with the separated phase and to solidify or gel the wall material to yield capsules having self-supporting walls. No such involved and difficult temperature gradient maintenance is required with the process and apparatus of the present invention, where a single elevated temperature is maintained in the reactor.

In the prior art batch encapsulation processes which utilize etherified methylol melamine as intended capsule wall material, polymerization of the etherified methylol melamine (EMM) begins at the time the EMM and the negatively-charged polyelectrolyte material come into contact. In production size equipment for the said prior art batch processes in which emulsification can take 35-45 minutes and produce a batch temperature of about 45° C., inclusion of the EMM in the batch with the other system components prior to emulsification of the intended liquid core material results in the formation and deposition of capsule wall material prior to obtaining the proper drop size reduction of the intended liquid core materials. This premature wall formation results in poor utilization of the wall materials and produces some microcapsules outside the acceptable size range.

When these prior art production size batch processes are altered to introduce the EMM after completion of emulsification there is produced a partial destabilization of the emulsion resulting in a growth of the drop size of the intended liquid core material. Techniques utilized to minimize this emulsion drop size growth are introduction of the EMM in a mixture with some of the negatively-charged polyelectrolyte material and maintenance of the entire batch at lower temperatures. These process modifications allow the production of microcapsules of a commercially acceptable size range.

The continuous process of the present invention overcomes the disadvantages of the prior art batch processes. In the present invention all components are mixed prior to initiation of emulsification of the core material without adverse effects on microcapsule size because the total lapsed time between addition of the EMM and completion of the emulsification is only a matter of seconds (13.5 seconds in the preferred embodiment). The thorough mixing of the components in the continous emulsification mill and the higher temperature of the exiting emulsion results in rapid polymerization of the EMM and subsequent deposition of this wall material to form microcapsules without emulsion destabilization. The microcapsules produced by the process of the present invention have a narrow and small drop size distribution and, faced with the experience with the prior art, are certainly unexpected.

Also, in order to perform the batch encapsulation processes disclosed in U.S. Pat. No. 4,100,103, the tank in which the encapsulation is performed must be heated in order to perform the process in a reasonable amount of time. This heating is accomplished either by means of a heating jacket on the tank or an immersion heater in the tank. As a result of the production of a series of several batches in these tanks, there is an accumulation of solid material at the surface where the heated member comes into contact with the capsule manufacturing vehicle. Periodically, this accumulation must be removed in a maintenance clean-up operation. This required clean up not only adds to the cost of capsule production, but, because of the time required, results in lower capsule output.

The process of the present invention, performed within the specified temperature range, produces no accumulation of solid material within the reaction conduit and hence a costly and time consuming requirement found in the prior art batch process is surprisingly eliminated by the practice of the continuous process of the present invention.

Prior art continuous encapsulation apparatus employing a multistage cascade of reaction vessels or flow through a series of hoppers by means of gravity are, in reality, just a series of batch processes where the product of each stage of the respective process merely flows by means of gravity to the next stage of the process. Such processes, when utilizing the in situ polymerization of EMM to produce capsule wall material, allow the first in (old) droplets of intended core material to have a greater chance to obtain thicker walls at the expense of the later in (newer) droplets. Such inhomogenity of reaction conditions results in capsules of non-uniform quality; that is, some capsules have thick walls and some capsules have thin walls. Conversely, in the process of the present invention, each increment of addition supplies fresh intended core material droplets and fresh reactants, providing all oil droplets equal opportunity to receive wall material with a concomitant high uniformity of capsule product.

BRIEF DESCRIPTION OF THE DRAWING

The accompanying drawing, wherein FIG. 1 is a schematic flow-diagram representation of the process and apparatus, is a further illustration of the invention. Individual components required in the present encapsulation process are fed continuously from supply tanks 1, 2 and 3 through conduits 4 by means of pumps 5 into the tubular conduit 6. The components then pass through the continuous emulsion mill 7 where they are intimately mixed and emulsified. Emulsion of intended core material in a vehicle comprising the other components of the encapsulation system pass from the emulsion mill into conduit 8 of the reactor 9. The entire reactor vessel including the conduit 8 is maintained at a single elevated temperature and no temperature gradients are required along the conduit. Also turbulent flow is not required to prevent agglomeration of embryonic capsules as they are formed. Finished mononuclear capsules of a narrow drop size distribution dispersed in the manufacturing vehicle are expelled at the exit end 10 of the encapsulating conduit 8.

DESCRIPTION OF PREFERRED EMBODIMENT

All parts and percentages are by weight, unless specified otherwise.

In practice of the invention, tank 1 contained an aqueous solution of a mixture of poly(ethylene-co-maleic anhydride) materials as listed in Table I.

TABLE 1

| Concentration | Material | Molecular Weight | Supplier |
|---|---|---|---|
| 1.4% | EMA-31 | 75,000–90,000 | Monsanto Chemical Co. St. Louis, Missouri |
| 2.6% | EMA-1103 | 5,000–7,000 | Monsanto Chemical Co. St. Louis, Missouri |

After the solution was prepared, it was adjusted to a pH of about 4 with 20% sodium hydroxide and maintained at a temperature of about 25° C.

Tank 2 contained, as intended capsule core material, the solution of chromogenic compounds listed in Table II.

TABLE II

| Concentration | Chromogenic Material |
|---|---|
| 1.7% | 3,3-bis(p-dimethylaminophenyl)-6-dimethylaminophthalide |
| 0.55% | 2'-anilino-3'-methyl-6'-diethylaminofluoran |
| 0.55% | 3,3-bis(1-ethyl-2-methylindol-3-yl)phthalide |

The solvent for the chromogenic compound solution was a mixture of 65 parts of a $C_{10}$–$C_{13}$ alkylbenzene and 35 parts of a benzyl xylene. Tank 2 was maintained at a temperature of about 100° C.

Tank 3 contained a 57% aqueous solution of methylated methylol melamine (Resimene 714, Monsanto Company, St. Louis, Mo.) maintained at a temperature of about 25° C.

The material in each of tanks 1, 2 and 3 was withdrawn through ⅜ inch o.d. (0.305 inch i.d.) stainless steel conduits 4 by means of pumps 5. These pumps were valveless variable flow rate, positive displacement metering pumps as supplied by Fluid Metering, Inc., Oyster Bay, New York and described in one or more of U.S. Pat. Nos. 3,168,872; 3,257,953, and 4,008,003. Each pump metered the respective encapsulation component into ⅜ inch o.d. stainless steel conduit 6 at the flow rates indicated in Table III.

TABLE III

| Component | Temperature | Relative Flow Rate | Typical Flow Rate |
|---|---|---|---|
| Contents of Tank 1 | 25° C. | 1.00 | 400 grams/minute |
| Contents of Tank 2 | 100° C. | 0.72 | 288 grams/minute |
| Contents of Tank 3 | 25° C. | 0.28 | 112 grams/minute |

Immediately following each pump was an optional flow meter to monitor the flow rate of each respective encapsulation component. These flow meters are not an essential part of the apparatus. By action of the flow of the encapsulation components into conduit 6, the components were partially mixed prior to entering the continuous emulsion mill 7. The emulsion mill was a continuous automatic mixer comprising a mixing head consisting of a moving toothed rotor and two stators, is supplied by the E. T. Oakes Corporation, Islip, N.Y. and is described in one or more of U.S. Pat. Nos. 2,572,049; 2,600,569; 2,679,866; and 3,081,069. The positive displacement pumps 5 provide the pressure and metered flow of the encapsulation components through the mixing chamber of the emulsion mill 7. The combination of the fluid flow rate, the fluid temperature and speed of the rotor determine the degree of subdivision of the liquid intended core material in the manufacturing vehicle. The parameters can easily be determined without undue experimentation by one skilled in the art.

The emulsion of intended capsule core material in the manufacturing vehicle flowed from emulsion mill 7 through optional temperature and pressure monitors into conduit 8 of reactor 9. Conduit 8 consisted of 150 feet of rubber hose submerged in a water bath maintained at 70°-75° C. (reactor 9). The first 50 feet of hose ¾ inch i.d. and the remaining 100 feet of hose was ⅝ inch i.d. The temperature of the emulsion coming from the emulsion mill 7 was 55°-60° C. Table IV lists the physical dimensions of conduit 8 from which residence time of each portion of encapsulation components in the reactor 9 can be calculated.

TABLE IV

| Hose Inside Diameter | Volume per foot | No. Feet | Total Volume |
|---|---|---|---|
| ¾ inch | 87.5 cc | 50 | 4,350 cc. |
| ⅝ inch | 60.5 cc | 100 | 6,050 cc. |
| | | | 10,400 cc. |

The total flow rate of all components from Table III was 800 grams per minute. The specific gravity of the component mixture was approximately one and, therefore, the residence time of any given portion of encapsulation component mixture in conduit 8 of reactor 9 was 13 minutes.

The finished capsule dispersion emerged from the exit end 10 of conduit 8 at a temperature of about 70° C. This finished capsule dispersion was immediately coated on a metal-modified phenolic resin CF paper to test for capsule wall formation as described in U.S. Pat. No. 4,100,103, column 8, lines 53–61. The reflectance of this coating as measured by an opacimeter was 72, indicating extremely satisfactory capsule wall formation after a residence time of only 13 minutes in the reactor. For comparison purposes, Example 18 of U.S. Pat. No. 4,100,103 was processed at a temperature of 70° C. for one hour and produced an opacimeter reflectance of 70. Since higher reflectance numbers represent less color and, in turn, better capsule wall formation, the process of the present invention produced better capsules at a comparable temperature in a much shorter period of time.

The finished capsule dispersion was also tested by formulating and coating a CB Sheet and testing against a metal-modified phenolic resin CF Sheet in a Typewriter Intensity test and an oven storage test of the CB Sheet as described in U.S. Pat. No. 4,100,103, column 7, line 21–column 8, line 2. In these tests the initial typewriter intensity was 56 and typewriter intensity after overnight storage of the CB Sheet in an oven at 95° C. was 59. These data indicate capsules having good shelf life, stability and storage properties.

Turbulent flow of a fluid in a conduit is defined by U.S. Pat. Nos. 3,812,056 and 3,816,331 as occurring when a dimensionless engineering value, termed the Reynolds Number, is greater than about 2000. Reynolds Number is designated by R in the following equation:

$$R = \frac{DV\rho}{\mu}$$

wherein
D is the diameter of the conduit;
V is the velocity of a cross-section of front of the fluid moving through the conduit;

$\rho$ is the density of the flowing fluid; and
$\mu$ is the viscosity of the flowing fluid.

When the Reynolds Number is calculated for the conditions of the preferred embodiment of the present invention, the following values are encountered for the first portion of conduit 8:

D = ¾ inch = 1.9 cm.
V = flow/cross section
flow = 800 cm³/minute = 13.3 cm³/second
cross-section = $\pi^2$ = 3.24(0.95)² = 2.83 cm²

$$V = \frac{13.3}{2.83} = 4.7 \text{ cm/second}$$

$\rho$ = 1 gram/cm³
$\mu$ = 100 centipoise = 1 poise or 1 gram/cm-second $$R = \frac{(1.9)(4.7)(1)}{1} = 8.9$$

If a Reynolds Number of 2000 or greater is required for turbulent flow, the flow in the ¾ inch portion of conduit 8 of the apparatus of the present invention is unquestionably *not* turbulent.

An analogous calculation for the second portion of conduit 8 shows:

D = ⅝ inch = 1.6 cm
flow = 13.3 cm³/second
cross-section = $\pi^2$ = 3.14(0.8)² = 2.01 cm²

$$V = \frac{13.3}{2.01} = 6.6 \text{ cm/second}$$

$$R = \frac{(1.6)(6.6)(1)}{1} = 10.6$$

The flow in the second portion of conduit 8 of the apparatus of the preferred embodiment of the present invention is, likewise, unquestionably *not* turbulent.

Using the same type of equations it was calculated that to obtain turbulent flow in conduit 8 of the apparatus of the present invention, utilizing the same flow rate and residence time, the conduit would have to be 0.0085 cm. in diameter and 1825 kilometers (1130 miles) long.

Not only are the parameters of process of the present invention far outside the scope of the continuous encapsulation prior art, but to alter the equipment of the present invention to operate within the scope of the prior art would be extremely impractical, if not impossible.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A process for continuously manufacturing minute capsules in a closed capsule manufacturing conduit comprising the steps of:
   (a) introducing
      (i) system modifier material selected from the group consisting of poly(ethylene-co-maleic anhydride), poly(methylvinylether-co-maleic anhydride), poly(acrylic acid), poly(propylene-co-maleic anhydride), poly(butadiene-co-maleic anhydride) and poly(vinyl acetate-co-maleic anhydride),
      (ii) intended capsule core material, and
      (iii) methylol melamine or etherified methylol melamine to form a mixture in an aqueous manufacturing vehicle;
   (b) conducting said mixture through a continuous emulsification mill;
   (c) conducting, under non-turbulent flow conditions, the emulsified mixture through a tubular reactor maintained at a temperature of about 40° to 95° C.; and
   (d) withdrawing the mixture through an exit opening of the conduit after a residence time in the conduit sufficient to yield self-supporting capsule wall material enwrapping the intended capsule cores, said mixture consisting of a dispersion system of capsules in the residual manufacturing liquid.

2. The process of claim 1 wherein the reactor is maintained at a temperature of 60° to 95° C.

3. The process of claim 2 wherein the reactor is maintained at a temperature of 70° to 75° C.

* * * * *